(12) United States Patent
Graunke (10) Patent No.: US 6,256,577 B1
(45) Date of Patent: Jul. 3, 2001

(54) USING PREDICTIVE TRAFFIC MODELING

(75) Inventor: Gary L. Graunke, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/398,603

(22) Filed: Sep. 17, 1999

(51) Int. Cl.[7] .................................................. G06F 165/00
(52) U.S. Cl. .......................................... 701/117; 701/202
(58) Field of Search ................................... 701/117, 118, 701/119, 122, 202; 340/905, 984, 988, 990, 993, 995

(56) References Cited

U.S. PATENT DOCUMENTS

| 5,272,638 | * | 12/1993 | Martin | 701/202 |
| 5,845,227 | * | 12/1998 | Peterson | 701/117 |
| 5,902,349 | * | 5/1999 | Endo et al. | 701/202 |
| 6,038,502 | * | 3/2000 | Sado | 701/119 |
| 6,052,645 | * | 4/2000 | Harada | 701/202 |
| 6,070,123 | * | 5/2000 | Beger et al. | 701/202 |
| 6,125,323 | * | 9/2000 | Nimara et al. | 701/202 |

FOREIGN PATENT DOCUMENTS

406066590 * 3/1994 (JP) ....................................... 701/122

OTHER PUBLICATIONS

James R. Goodman, Mary K. Vernon and Phillip J. Woest, "Efficient Synchronization Primitives for Large–Scale Cache–Coherent Multiprocessors", ASPLOS–III Proceedings, Third International Conference on Architectural Support for Programming Languages and Operating Systems, Boston, Massachusetts, Apr. 3–6, 1989.

* cited by examiner

Primary Examiner—Richard M. Camby
(74) Attorney, Agent, or Firm—Trop, Pruner & Hu, PC (57) ABSTRACT

A system may receive requests for traffic routing information from a plurality of vehicles and may provide a suggested route, not only based on actual current conditions and historical information, but based on the application of a predictive model. The predictive model may use information about current traffic conditions and historical information to predict the actual conditions that will occur in the course of traversing a desired route to an intended destination. In this way, the system may adapt for the dynamic nature of traffic conditions.

12 Claims, 5 Drawing Sheets

USING PREDICTIVE TRAFFIC MODELING

BACKGROUND

This invention relates generally to techniques for routing traffic.

A large amount of traffic information is available from a variety of sources. This information may be used by drivers to attempt to select from among a variety of potential routes to travel to a given destination. However, this traffic information tends to become outdated, often by the time the operator reaches locations that were expected to be either congestion-free or congested. Moreover, traffic patterns are dynamic. For example, a problem in one area may cause a large number of drivers to use an alternative route, creating a problem in another area.

Thus, existing techniques for disseminating traffic information (e.g., radio and television broadcasts) are largely ineffective in part because they do not account for the dynamic nature of traffic patterns. Existing techniques may cause some problems because drivers alerted to a problem in one area may cause congestion in another area, even after the problem that originally caused the diversion is long past.

Other factors that tend to lessen the effectiveness of existing traffic information techniques are the lack of sufficient detail. Also, there are usually not enough drivers that react to the information. Finally, it is believed that computation is important to assess each driver's impact and to present rational alternatives.

Thus, there is a continuing need for a traffic routing system that is capable of adapting to the dynamic nature of traffic patterns.

SUMMARY

In accordance with one aspect of the present invention, a method of routing traffic includes developing at least two potential routes using a processor based system. The system is then used to apply a predictive model to select one of the routes.

DETAILED DESCRIPTION

Figure 1:
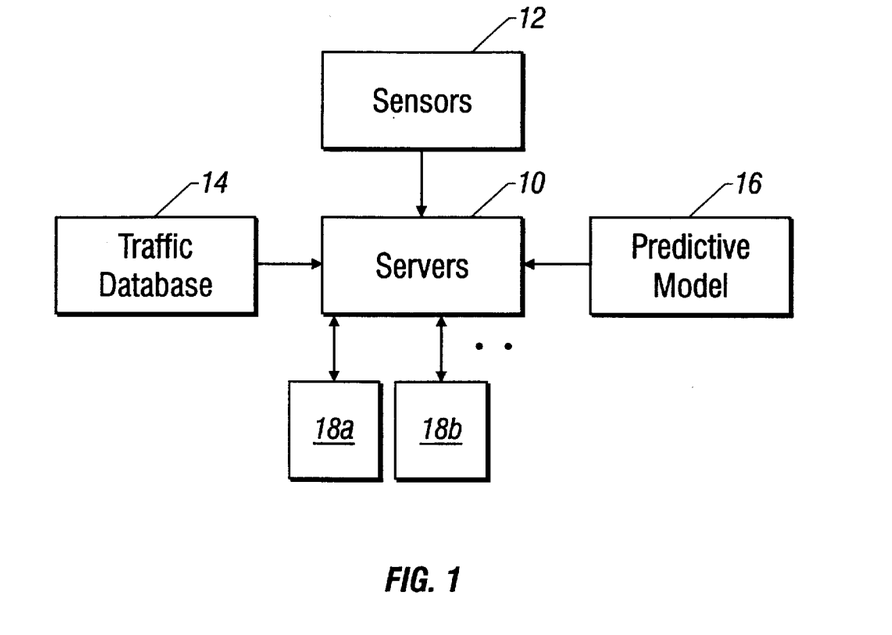
FIG. 1 is a block diagram depiction of a traffic routing system in accordance with one embodiment of the invention.

Referring to FIG. 1, a traffic routing system may include a server 10, which communicates with a plurality of traffic information sensors 12. The sensors may be, for example, sensors in particular vehicles that sense vehicular position. In another embodiment, sensors may be placed in or along different roadways to determine the amount of traffic and the speed of that traffic. Alternatively, the sensors 12 may be video cameras that are placed at strategic locations to provide information about traffic congestion and traffic speeds.

The server 10 also receives traffic information from a traffic database 14, which may include reports of existing traffic patterns, as well as historical information about how traffic varies under different conditions and over different times. Finally, the server 10 may also receive information from a predictive model server 16, which predicts, based on the existing conditions, how traffic conditions will vary during a future time interval. All of this information may then be transmitted by the server 10 to a plurality of receivers 18, which may be located in individual vehicles.

The transmission system between the server 10 and the vehicles 18 may, for example, be implemented using cellular telephone technology, i.e., each of the receivers 18 may include a cellular transceiver which receives information from the server 10 and transmits information back to the server 10. For example, each vehicle may transmit requests for routing information together with information about its current position, which may be used by the server to develop information about how a particular vehicle is maneuvering through traffic. This data from individual vehicles may be added to the traffic database 14 and combined with a variety of other information, including information from other vehicles, to develop information about the current traffic conditions. Of course, other distribution techniques may be used, including conventional radio frequency communications and communications through transmitters located in the roadways, as additional examples.

The communication links between the servers 10 and the variety of receivers 18 need not be maintained continuously open in some embodiments. For example, a receiver 18b may transmit a short communication to a server 10, indicating its current position and requesting a route to a given destination. The communication link may then be disconnected. A server 10, having received a request and the appropriate address to communicate with the receiver 18 may, once the information is available at the server, contact the particular receiver 18, provide the information, and then disconnect the communication link.

Figure 2:
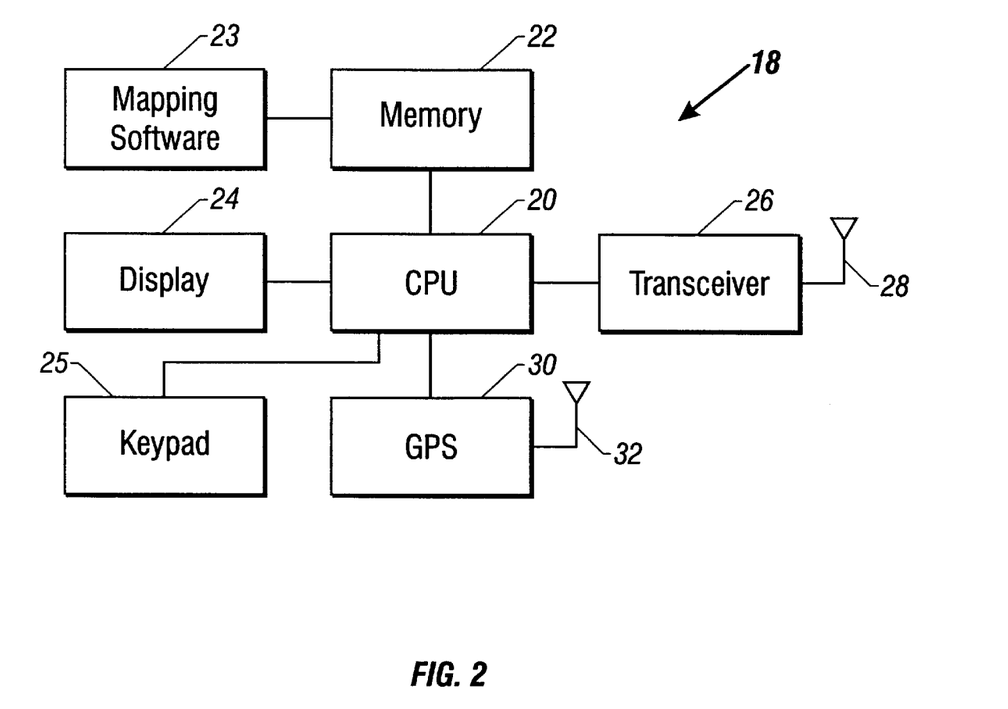
FIG. 2 is a block depiction of a receiver shown in FIG. 1.

Referring now to FIG. 2, a receiver 18 may include a processor 20 which communicates with a memory 22. The memory 22 may store software, including the mapping software 23. The mapping software 23 may be conventional software which takes coordinates and converts those coordinates into graphical depictions on a map display. For example, the coordinates may be overlaid over an appropriate map to show the position of the vehicle or a destination position.

The processor 20 also communicates with a transceiver 26 and the antenna 28, for example, to implement a radio frequency based system, e.g., a cellular communication system. The processor 22 may communicate with a display 24 and a keypad 25.

The processor 20 may also receive information from a position location system. A variety of conventional position location systems may be used. In one embodiment of the present invention, a global positioning system (GPS) receiver 30 may be provided with an antenna 32 to receive GPS signal information and provide such information about the vehicle's current position to the processor 20. That information can, for example, be transmitted by the transceiver 26 and the antenna 28 to a server 10.

A request or other transmission from the processor 20 may be linked automatically to coordinates from the position location system. Thus, a transmission includes linked information about the vehicle's current position. This information may be relevant to the request, but even if not, the position information may be used by a server 10 to determine rates of travel of a particular vehicle 18a or 18b, which may be useful information in understanding existing traffic patterns.

In one embodiment only information deemed exceptional data may be transmitted. As an example, information that exceeds three standard deviations from predicted speeds may be deemed exceptional. Alternatively, the post trip reporting may be sufficient to update historical data in a way that conserves communication bandwidth.

Figure 3:
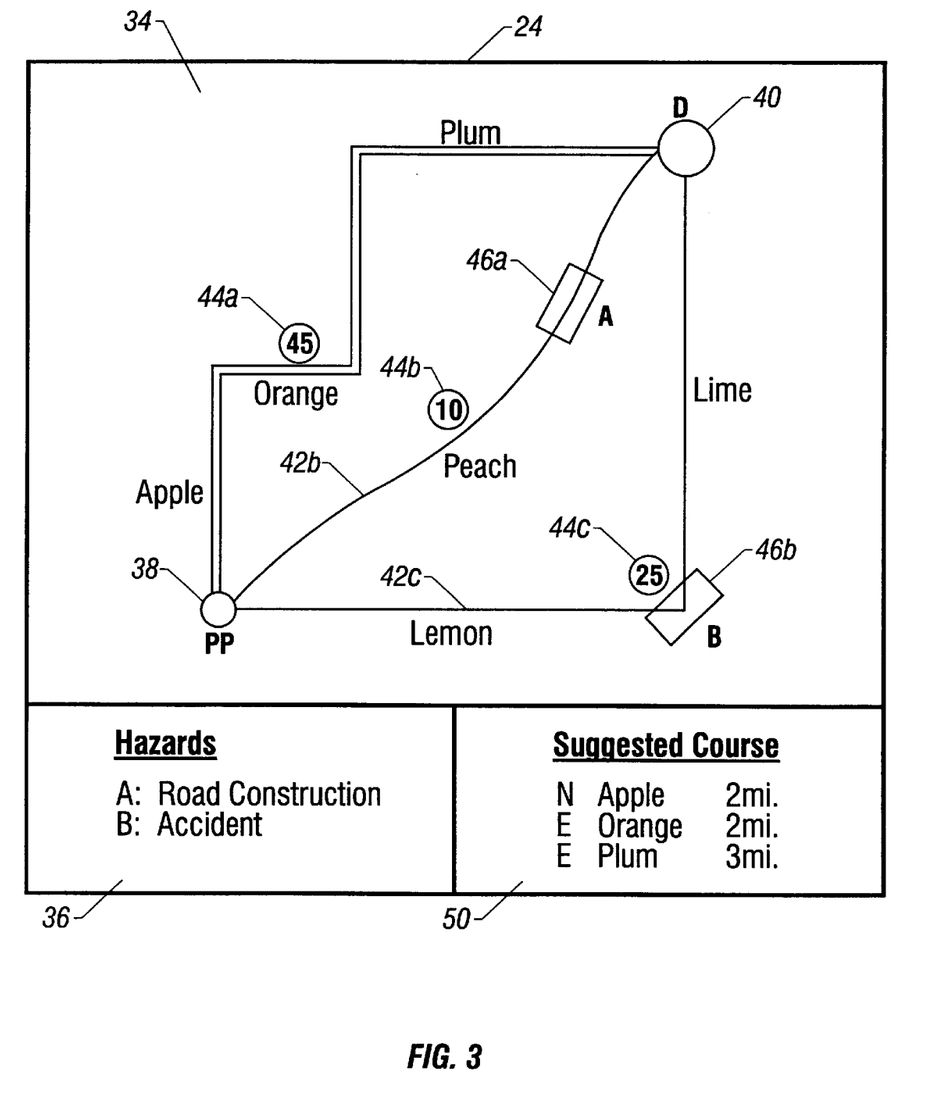
FIG. 3 is a display of a graphical user interface, which may be used in connection with the receiver shown in FIG. 2.

Referring now to FIG. 3, the display 24, in one illustrated example, may include a first portion 38 containing a map display and a portion 36 providing information about hazards that currently exist. The portion 50 of the display 24 provides a suggested course or route of travel. Thus, referring to the display portion 34, three potential travel routes 42a, 42b, and 42c are available for travel between the vehicle's current position 38 and an intended destination 40. The destination, for example, may have been entered through the keypad 25.

Thus, the display 24 includes a map of the potential paths of travel. It may provide information about each path of travel, including the names of the streets that would be traversed. In addition, information is provided about the existing speed conditions on each route. For example, the speed indicator 44a indicates the likely average speed along the route 42a, and similarly the speed indications 44b and 44c provide the same information for the paths 42b and 42c, respectively.

In addition, information can be provided about existing traffic hazards or special conditions, as indicated at 46a and 46b. For example, referring to the hazards portion 36 of the display, the icon 46a, labeled "A" on the display, indicates road construction, while the icon 46b, labeled "B" on the display, indicates an accident.

The system analyzes all the available information, including information from the traffic database 14 and a predictive model server 16, together with traffic sensor information 12, and determines the preferred route. In the illustrated example, the preferred route is the route 42a, as indicated by the double-line icon over the proposed route. In this example, even though the selected route seems more circuitous, because of traffic conditions on the other potential routes, which may appear more direct, the system has determined that is preferable to use the route 42a. Thus, the suggested course of travel, including the directions and street names, is provided on the display region 50. In addition, information can be provided about how far to proceed on each street so the driver may easily follow the recommended route.

Figure 4:
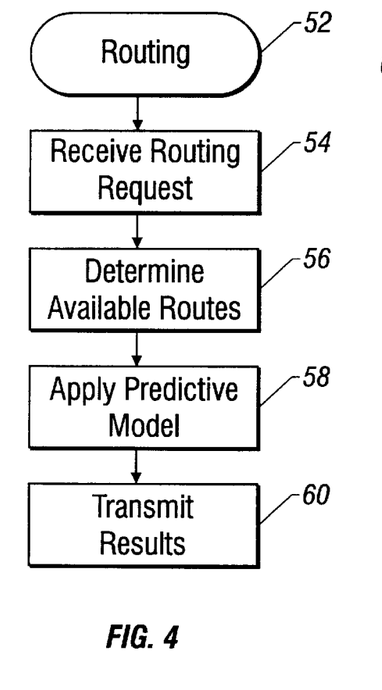
FIG. 4 is a flow chart for implementing one embodiment of the present invention.

Turning now to FIG. 4, software 52 for implementing the system may be stored on the server 10. Initially, a request for routing information may be received from one of the vehicles 18, as indicated at block 54. Alternatively, the information may be broadcast to all receivers on a periodic basis. The server 10 determines the potential available routes (block 56) and applies the predictive model (block 58). The predictive model takes current conditions and historical traffic information and develops a prediction of what traffic conditions will be like over a given interval of time. Ideally, this interval of time is the actual time the user would traverse from its present position to a proposed destination. Thus, the model provides information using real time input information about what the traffic conditions will be like over the time period of interest, namely the time when the user is traversing the given route.

Using that information, a preferred routing is developed and that routing information is transmitted from the server 10 to the requesting vehicle 18, as indicated in block 60. Since the requesting vehicle provided an identifier, or phone number in one example, the server 10 may re-contact the requesting vehicle and provide the proposed route information for viewing on the display 24, as shown in FIG. 3.

Figure 5:
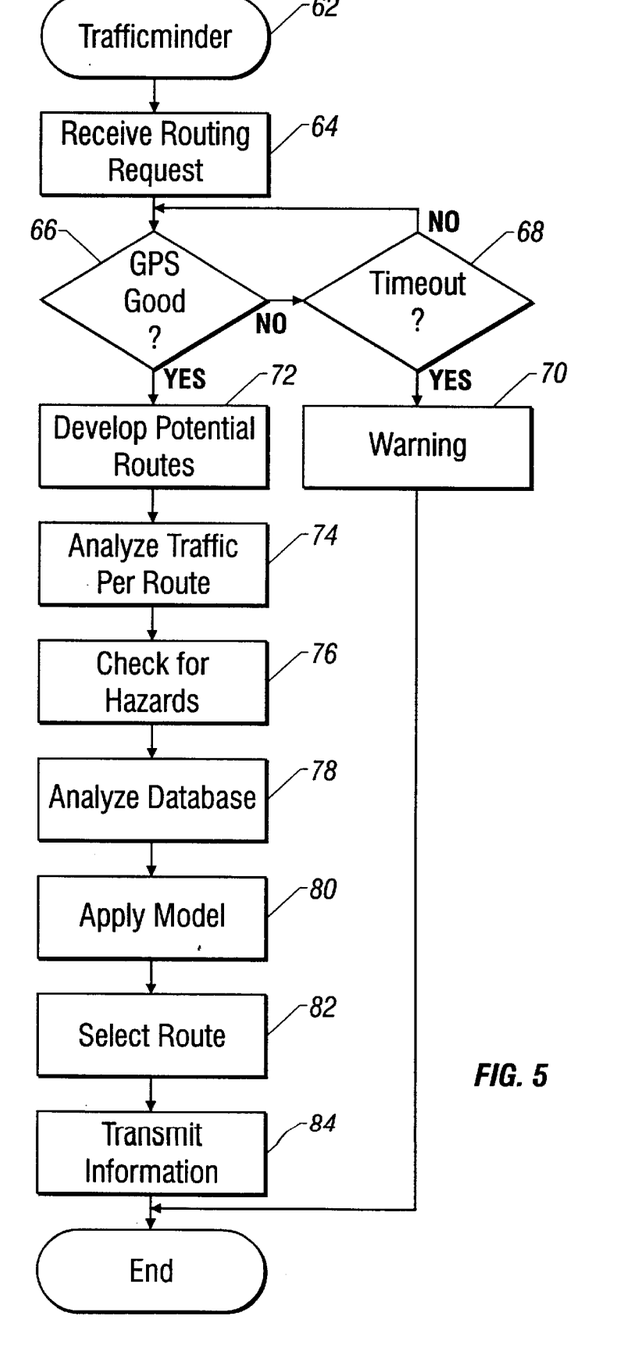
FIG. 5 is a flow chart for implementing a specific application of the software illustrated by FIG. 4.

Referring next to FIG. 5, a flow for a more detailed embodiment is illustrated. The software 62 is an example of one way of implementing the general flow illustrated in FIG. 4. Initially, a routing request is received, for example, over a communication link by way of a transceiver 26 in one of the vehicles 18 and a corresponding transceiver in the server 10, as illustrated by the block 64. Next, the server 10 determines whether the GPS information provided with the request from the vehicle 18 appears to be correct GPS information. If the information is not correct, the system may wait for the vehicle to acquire a good GPS signal, i.e., the vehicle may be asked to retransmit the GPS coordinates until such time as good GPS data is obtained.

If the GPS data received is not good, as indicated by the check at diamond 66, a check at diamond 68 determines whether a "time out" has occurred. If not, the system continues to wait for good GPS data. Otherwise, if an excessive amount of time has gone by, a warning may be produced, as indicated at 70.

In the illustrated embodiment, the flow is terminated, but in many cases, it may be possible to simply proceed, even without good GPS data. For example, position information may be obtained based on a previous request from the vehicle, or the same vehicle operator may be asked to provide current position information, if relevant.

In the case where the request involves a request for routing information between a current position and a proposed destination, the server 10 determines the potential routes, as indicated in block 72. Next, the server analyzes the traffic information for each route. The server may do this using the traffic database and information about historical traffic patterns, together with information received from the sensors 12. In addition, in some embodiments, a check may be undertaken for particular hazards, as indicated in block 76, e.g., road construction, weather problems, accidents or congestion. This information may be developed from information from various vehicles, other news sources or the radio traffic information system.

Next, the database of traffic information, together with the sensor information and any other information, may be analyzed to come up with a value for the projected correction factor for posted speed limits for each proposed route of travel as indicated in block 78. At this point, the predictive model is applied and a particular route is selected as indicated in blocks 80 and 82. The selected route, together with particular directions, may be transmitted as indicated in block 84. The suggested route, in coordinate form, may then be operated on by the mapping software 23 to display the routes and proposed paths as icons on a graphical user interface, as indicated in FIG. 3.

In accordance with one embodiment of the present invention, the predictive model makes use of vehicle counts, and average time for segments. Counts are the number of vehicles that traverse a given segment over a given time period. Average times are the average times of all the vehicles that traverse the given segment in a given time period. A segment is a one-way section of roadway bounded on one end by a vehicle entry point and the other end by a vehicle exit point. The segments are built up based on the history of vehicular traffic. The segments are the nodes in a street graph. The street segments are non-divisible in that nearly all traffic that enters a given segment will exit the segment at its exit point.

Figure 6:
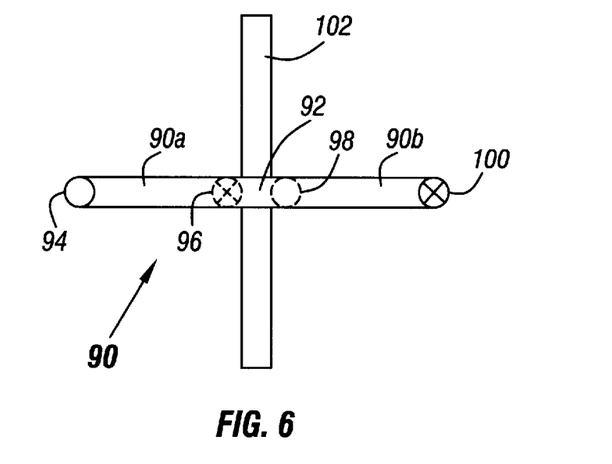
FIG. 6 is a drawing showing the conversion of one segment into two segments.

Referring to FIG. 6, when a sufficient number of vehicles make a given turn within a given segment 90, two new segments 90a and 90b are defined, separated by the point 92 of the turn to the cross-street 102. Thus, the new segment 90a includes the original entry point 94 and a new exit point 96 adjacent to the new entry point 98 of the second new segment 90b. The segment 90b has the exit point 100 of the original segment 90. The point 92 where turns are made is called an arc. Thus, in a four-way intersection, there may be as many as twelve arcs and eight segments bounded on that intersection.

Each segment's entry and exit points are associated with latitude and longitude values. Thus, a two-way street is represented as two one-way street segments. In addition, for particularly winding sections of roadway, multiple sections may be artificially segmented in order to relate GPS coordinates to positions on the street segments.

A database of past traffic history is maintained. For each time interval and for each arc, the count, the average of the variance for all reporting vehicles traversing the entry point to a given segment and the exit point from a given segment is recorded. These values may be represented as the count, sum of the times, and sum of the times squared. The time interval is advantageously chosen to be longer than traffic light times. For example, in one embodiment of the present invention, the time interval may be chosen to be 10 minutes.

In one embodiment of the present invention, initially a map database is not utilized, but instead, the map is built up from segments actually traversed by vehicles using the system. As more and more reports for vehicles come in, the street map may be continually refined by discovering new intersections and new segments as they are used. Existing street maps may optionally be used to augment the street segments used in the model. However, in general, street maps and street map databases are most useful in providing street names, primarily for a vehicle's user interface.

A trip report may include a list of street segments and the time at which each street segment was entered for a given trip. Post trip reports may be sent to the transaction servers 10 at the completion of the trip via a point to point radio link. The vehicle's on-board processor 20 may use street segments from a map to compose the report.

The transaction servers 10 may add counts, sums of average times and sums of average times squared for each segment and time interval in the trip report to develop the new daily historical traffic record. However, when uncharted segments are received, they are added to the database. When a street segment is first traveled, the server may not distinguish ordinary straight line travel along the street from crossing an intersection. However, as subsequent travelers make turns, the intersection can be identified as an arc, and the street segments split into a series of smaller segments as described previously.

In the interest of confidentiality, trips that begin or end in the middle of a street segment may not always be used to split streets. For this purpose, small diversions such as drive-in banking or fast food restaurants may not be considered the end of one trip and the beginning of another. These are recognizable by the small number of diversions relative to the traffic volume. To deal with this situation, street segments may be combined if only a tiny fraction of the traffic begins or ends at the point where two straight line segments join.

Traffic for every street segment may be predicted by finding a segment specific historical record for the time of day that most closely matches the present situation. For novel situations, where no satisfactory match exists in the historical record, the present situation may be assumed to continue.

For periods where there are no traffic logs (i.e. zero counts), the average time may be assumed to be the minimum observed time (maximum speed). The variance may be assumed to be zero. An exception to this technique is a road closure which may be entered manually at the prediction server.

As drivers transmit their route plans, counts of anticipated traffic in the upcoming time intervals can be computed using a scalable combining algorithm to be described later. For future time intervals too distant to be covered by transmitted route plans, past counts based on the time of day and the week and season can be used. The holiday calendar may be entered on the server so that holidays are continually matched with prior holidays in past years. In addition, weather may be manually inserted into the database.

For each arc exiting a street segment, the prediction server 10 may select a small number of preceding and succeeding street segment exit arcs and time intervals. These include the directly preceding and succeeding segments as well as a preceding or succeeding segments as needed to cover the time period. Advantageously, traffic in all directions may be included for preceding and following intersections of the segment to be matched.

For each of Y segments, the past normalized times for X time periods and counts for X past and X future time periods may be utilized in connection with one embodiment of the present invention. Where X=3 and Y=3 this yields 27 numbers. The server may compute the sum of the squares of the differences between each candidate's normalized time period and the last time period. The values may be normalized by dividing the differences by the average (over the different time periods) count or the average time for that segment. Then the candidate time period that has the minimum sum of squares is selected as the closest match and the historical values for the period immediately following the matched period, are used as the average time and variance prediction for the segment in the next time period.

The matching algorithm may be as follows:

$$\sum_{T=-X}^{X-1} \sum_{J} \left( \frac{W_{JT} - C_{JT}}{D_J} \right)^2$$

where:
X equals the number of time intervals arbitrarily used;
$W_{JT}$ equals the current condition J at time now plus T;
$C_{JT}$ equals the database condition at time candidate plus T; and
$D_J$ equals the average of database for the condition J.

Thus, in one embodiment, the condition J may be the number of average times and counts. T may be the defined time interval such as ten minutes and D is the database overall average for either average time or count as the case may arise.

Figure 7:
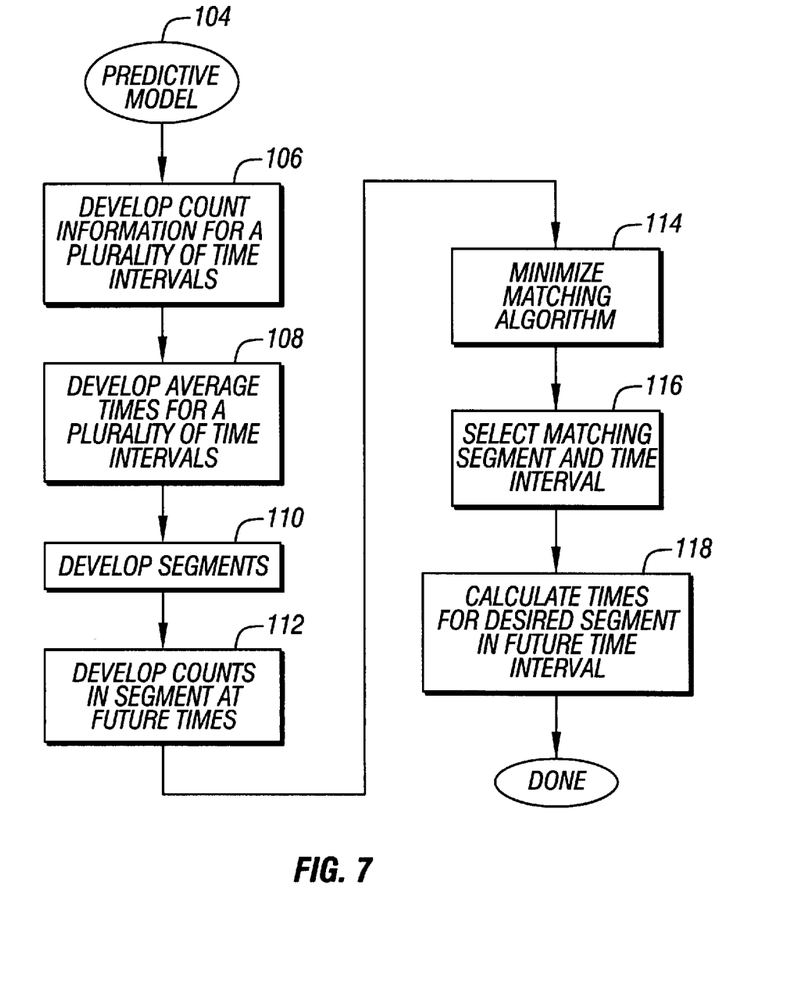
FIG. 7 is a flow chart for software implementing one embodiment of a predictive model useful in conjunction with the present invention.

Referring to FIG. 7, one embodiment for software for implementing the predictive model 104 begins by developing count information for a plurality of time intervals as indicated in block 106. Also, the model develops average times for a plurality of time intervals as indicated in block 108. As indicated in block 110, the segments are built up over time. Once this information is developed, the counts may be developed for a particular segment at future times as indicated in block 112. This would involve analyzing current vehicle positions, predicted routes and determining, based on database information, when in the future at a given segment a given vehicle will arrive.

With all this information, the matching algorithm is calculated for a plurality of intervals and a plurality of segments and minimized as indicated in block 114. Based on the minimum of the matching algorithm, the matching segment and time interval are chosen to match the characteristics expected for a future time interval as indicated in block 116. The times for desired segments in the future time interval are calculated as indicated in block 118. This information may then be displayed for the user in an appropriate graphical user interface. For example, in some embodiments of the present invention, the coordinates used for the calculations in the matching algorithm may be converted into points on a graphical map display.

Once the minimum sum of squares is found, the corresponding segment and time interval may be denominated as the best match and may be utilized as the predictor for the segment and the period of interest. In some cases, heuristics may be used to minimize the number of calculations that are needed. That is, instead of making all of the potential calculations, assumptions may be utilized. For example, if a given day has the sum of the squares below a certain value and it is the same day of the week as the target period, it may be assumed to be the best match.

In some embodiments, a historical database formed from post trip reports is utilized to predict a future time. For example, to predict traffic patterns at three o'clock on Tuesday in this week, the best potential match may be three o'clock on Tuesday in the preceding week. However, if there is rain today and no rain a week ago, the data from today may not match well with the data from a week ago. Thus, the algorithm may find a better match in another day of the week.

Each driver has the option of transmitting his or her travel plans to the server. Each driver's route selection may be used to build counts for road segments in the near future. The proposed route itself need not be recorded but it may be retained in the vehicle computer in order to enable updating of the route if the route changes.

Obviously, a large amount of data could potentially be provided from a large number of vehicles in some embodiments. This could slow the processing of the system and could ultimately be a problem. However, by using a scalable combining algorithm to combine counts, sum of times, and sum of the times squared, efficient processing of large amounts of data may be implemented. For example, a scalable "fetch-and-add" algorithm may be utilized for this purpose as is well known in the art. See the appendix to Goodman, James R. et al., "Efficient Synchronization Primitives for Large-Scale Cache-Coherent Multiprocessors," Proceedings of the $3^{rd}$ Conference on Architectural Support for Programming Languages and Operating Systems, IEEE Computer Society, Boston, Mass., Apr. 3–6, 1989.

The predicted average speeds and the variances for all segments in the near future time segments may be broadcast to all the receiving vehicles. Aside from the obvious utility of informing the driver of changing conditions, the vehicles may not report deviations from the predicted speed within three standard deviations.

Each vehicle updates its prediction of the chosen route and recomputes the shortest time to reach surrounding points on the map. The vehicle computer may suggest a route from the current position to the destination. Known algorithms for determining the shortest path between two points may be used. See, Dijkstra, E. W., "A Note on Two Problems in Connection with Graphs," Numerische Math., Vol. 1, 1959, pp. 269–271.

Drivers may chose a route manually using the shortest time display or by any other means. If the route is confirmed, it may be communicated to the transaction server. The confirmation of the route is optional but helps the system more accurately predict future bottlenecks. Even if no route is confirmed, the system may optionally enter a guess from observing a current route. The beginning and end of the route, as determined by user controlled parameters, may be omitted from the communication to ensure privacy.

In this way, the reservation of future routes improves the accuracy of the predictive model by supplying counts for streets segments and arcs in the server-predicted time slots. In addition, it allows drivers to avoid creating congestion by choosing alternative routes when congestion would otherwise occur in the future.

The display of information developed by the model may be implemented in a variety of ways. A simple shortest path algorithm may be used with the predicted times and the street segments to create a display and the shortest time to reach each street segment. In one embodiment of the present invention, each segment may be color coded as a function of the shortest time to reach it, so that the best routes become apparent to the driver.

Figure 8:
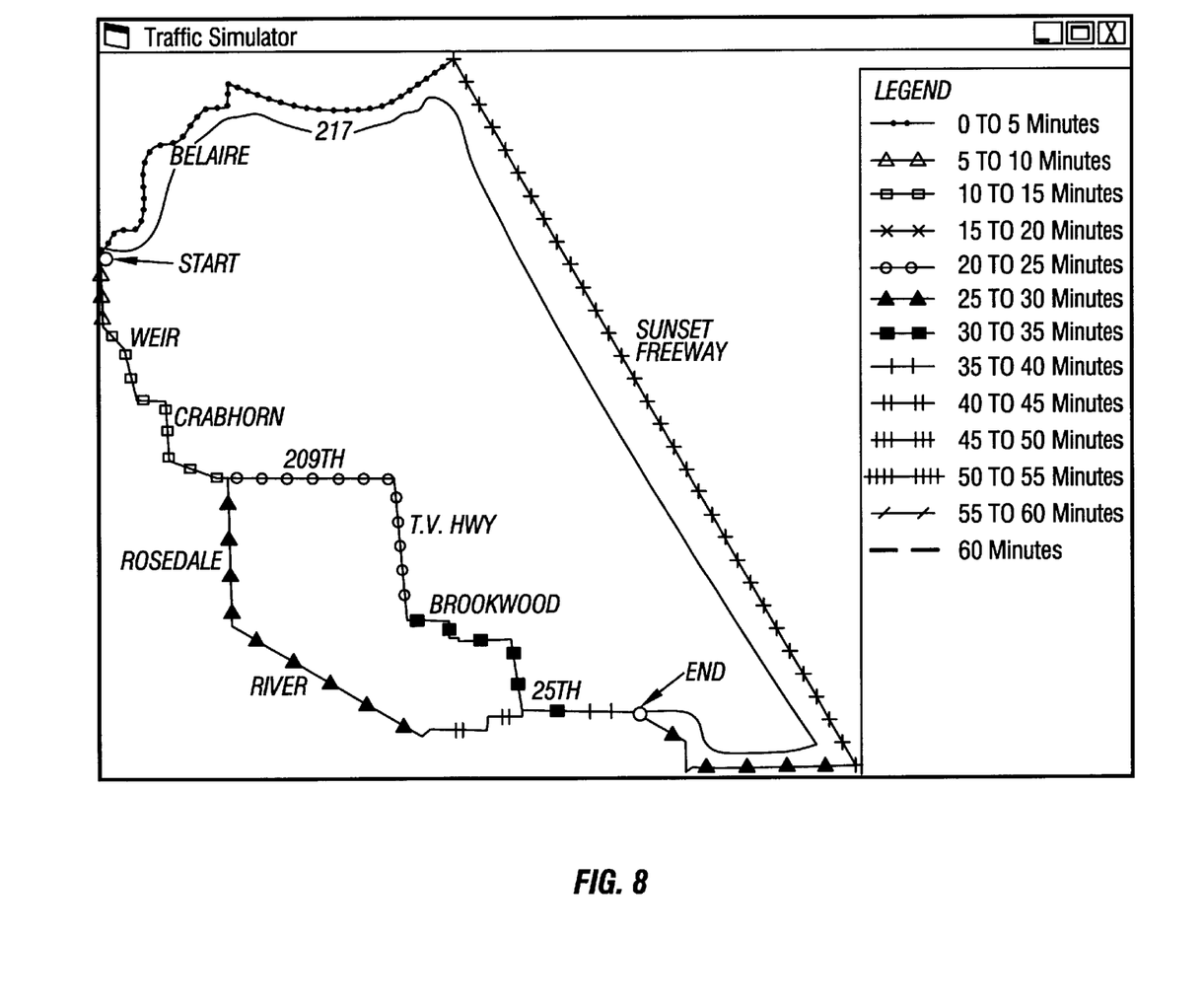
FIG. 8 is a graphical user interface that may be used in conjunction with one embodiment of the present invention.

Thus, an example of a graphical user interface is shown in FIG. 8. Each of the different time periods under the heading "legend" may be represented by a color coding on the map image or by using a distinctive graphical indication as illustrated. Thus, the user can quickly see the system's proposed path, which is indicated by a double line, and can quickly be advised of the times associated with a variety of alternative paths. A start position and end position for the proposed path may be indicated by the graphical user interface.

If traversal of the given street segment takes significantly longer or shorter than was expected, the receiver 18 may report that fact to the prediction server 16 via the transaction server 10 using a point to point radio link. This may allow everyone to be updated quickly. If the trip plan was previously transmitted, the vehicle counts were also updated. The server may subtract parts of the old trip plan that are no longer valid from the counters and increment arcs for the new plan using a scalable combining algorithm. The inclusion of the variance (computed from the count, sum of the times, and sum of the times squared), allows the system to accommodate normal variances due to traffic lights, buses and other factors.

After the vehicle has completed its trip, a log may be provided over the point to point link to the transaction server 10. A log from a large number of vehicles may be merged to create an accurate historical record for the time period. For each street segment and time interval, the count, sum of times and sum of the times squared, may be recorded.

Only a small, representative number of vehicles may be needed to make the system work. Indeed, this would be the case during the initial deployment where only new vehicles will participate in reporting. There would be no ill effect if some individuals did not report.

Using the predictive model, current information, together with historical information, may be used to predict what the traffic patterns will be like over a given period of time. This allows the system to be dynamic and to account for the dynamic nature of traffic patterns. Therefore, the user may be provided with not only the best route, given current traffic conditions, but the best route that is predicted for the traffic conditions that will actually exist as the user traverses a particular route.

While the present invention has been described with respect to a limited number of preferred embodiments, those skilled in the art will appreciate numerous modifications and variations therefrom. It is intended that the appended claims cover all such modifications and variations as fall within the true spirit and scope of the present invention.

What is claimed is:

1. A method for developing a predictive model of traffic flows comprising:

developing a database of the count of the number of vehicles and their times for traversing a given segment at a plurality of different times;

using said database to determine an amount of time to traverse said segment at a future time; and using a matching algorithm to find a segment and time interval that matches a characteristics of a future time interval.

2. The method of claim 1 including comparing the information determined from said database to actual time information to reduce the amount of information to develop the database.

3. The method of claim 1 including finding a segment specific historical record for the time of day that most closely matches a given situation.

4. The method of claim 3 including selecting a number of preceding and succeeding street segments and time intervals and using information about the times for these intervals to predict a future time for a given interval.

5. The method of claim 1 further including developing counts for a particular segment at a future time and using information about current vehicle positions and predicted routes to determine an amount of time to traverse said segment at a future time.

6. The method of claim 1 including estimating the travel time to reach a particular location based on the time taken to reach a similar location during the time interval identified by the matching algorithm.

7. An article comprising a medium for storing instructions that cause a processor-based system to:

develop a database of the count of the number of vehicles and their times for traversing a given segment at a plurality of different times;

use said database to determine an amount of time to traverse said segment at a future time; and use a matching algorithm to find a segment and a time interval that matches the characteristics of a future time interval.

8. The article of claim 7 further storing instructions that enable the processor-based system to compare the information determined from the database to actual time information to reduce the amount of information to develop the database.

9. The article of claim 7 further storing instructions that enable the processor-based system to find a segment specific historical record for the time of day that most closely matches a given situation.

10. The article of claim 9 further storing instructions that enable the processor-based system to select a number preceding and succeeding street segments and time intervals and use information about the times for those intervals to predict a future time for a given interval.

11. The article of claim 7 further storing instructions that enable the processor-based system to develop a count for a particular segment at a future time and use information about current vehicle position and predicted routes to determine an amount of time to traverse such segments at a future time.

12. The article of claim 7 further storing instructions that enable the processor-based system to estimate the travel time to reach a particular location based on the time taken to reach a similar location during the time interval identified by the matching algorithm.

* * * * *